United States Patent [19]

Yoshizawa et al.

[11] Patent Number: 5,136,673
[45] Date of Patent: Aug. 4, 1992

[54] OPTICAL CABLE AND ITS MANUFACTURING METHOD

[75] Inventors: Nobuyuki Yoshizawa; Tsuneo Horiguchi; Koushi Ishihara, all of Mito; Tetsuro Yabuta, Katsuta; Toshio Kurashima; Hidenobu Tada, both of Mito, all of Japan

[73] Assignee: Nippon Telegraph and Telephone Corporation, Tokyo, Japan

[21] Appl. No.: 706,284

[22] Filed: May 28, 1991

[30] Foreign Application Priority Data

May 28, 1990 [JP] Japan .................. 2-135287
Jan. 28, 1991 [JP] Japan .................. 3-25242

[51] Int. Cl.⁵ .............................. G02B 6/44
[52] U.S. Cl. .................................... 385/103
[58] Field of Search ............ 385/102, 103, 141, 147

[56] References Cited

U.S. PATENT DOCUMENTS

| | | | |
|---|---|---|---|
| 4,093,342 | 6/1978 | Ford et al. | 350/96.23 |
| 4,684,213 | 8/1987 | Ishihara et al. | 350/96.23 |
| 4,701,015 | 10/1987 | Saito et al. | 350/96.23 |
| 4,752,113 | 6/1988 | Saito et al. | 350/96.23 |
| 4,832,443 | 5/1989 | Cameron et al. | 350/96.23 |
| 4,840,452 | 6/1989 | Federmann et al. | 350/96.23 |
| 5,013,126 | 5/1991 | Hattori et al. | 350/96.23 |
| 5,028,116 | 7/1991 | Bonicel et al. | 350/96.23 |

FOREIGN PATENT DOCUMENTS

| | | |
|---|---|---|
| 0032761 | 7/1981 | European Pat. Off. . |
| 0182030 | 5/1986 | European Pat. Off. . |
| 0284667 | 10/1988 | European Pat. Off. . |
| 2135790A | 9/1984 | United Kingdom . |
| 2143051 | 5/1986 | United Kingdom . |

OTHER PUBLICATIONS

Journal of Lightwave Technology, vol. LT-3, No. 1, Feb. 1985; pp. 184-189; Recent Developments in Hermetically Coated Optical Fiber, Glaesemann et al.

Electronics and Communications in Japan, Part 2, vol. 70, No. 7, 1987, pp. 62-71; Water Propagation Blocking Properties of Submarine Optical Fiber Cables: Yoshizawa et al.

International Wire & Cable Symposium Proceedings 1986, pp. 17-23; Multi-Hundred-Feber Cable Composed of Optical Fiber Ribbons Inserted Tightly Into Slots; Hatano et al.

Technical Digest, vol. 2 of 5, Jul. 18-21, 1989, Kobe, Japan; pp. 64-65; Characteristics of 1000-Fiber Optical Cable Composed of Tape-Slot Type Optical Fiber Units: Katsurashima et al.

Journal of Lightwave Technology, vol. 6, No. 2, Feb. 1988; pp. 240-244; Design and Characteristics of Optical Fiber Unit for Submarine Cable Yoshizawa et al.

*Primary Examiner*—Akm E. Ullah
*Attorney, Agent, or Firm*—Frishauf, Holtz, Goodman & Woodward

[57] ABSTRACT

An optical cable has a center member, around which a plurality of coated optical fibers are tightly stranded. Each optical fiber is given uneven strains in its longitudinal direction. Adhesive resin is applied to surround each of the coated optical fibers and binds each of them to the center member to make an integral optical unit when cured.

7 Claims, 10 Drawing Sheets

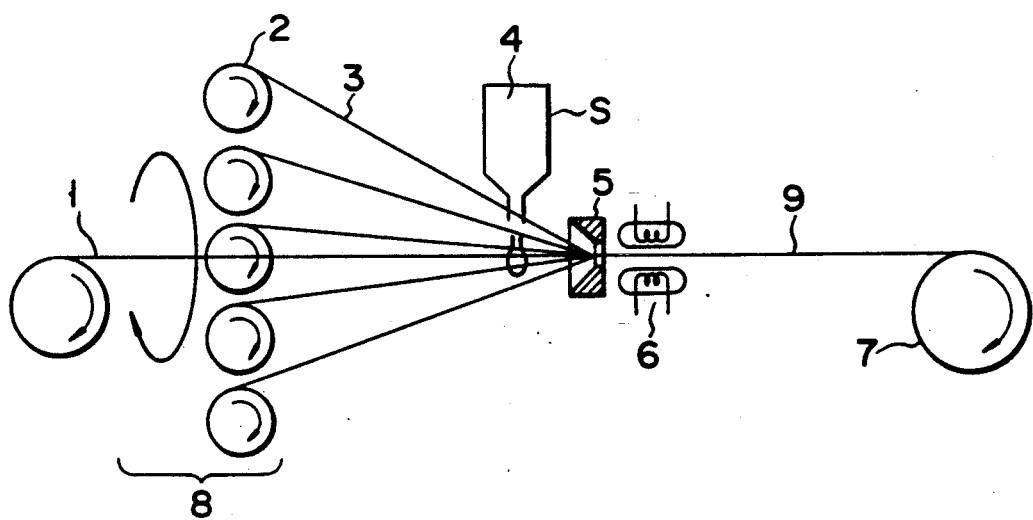
F I G. 2

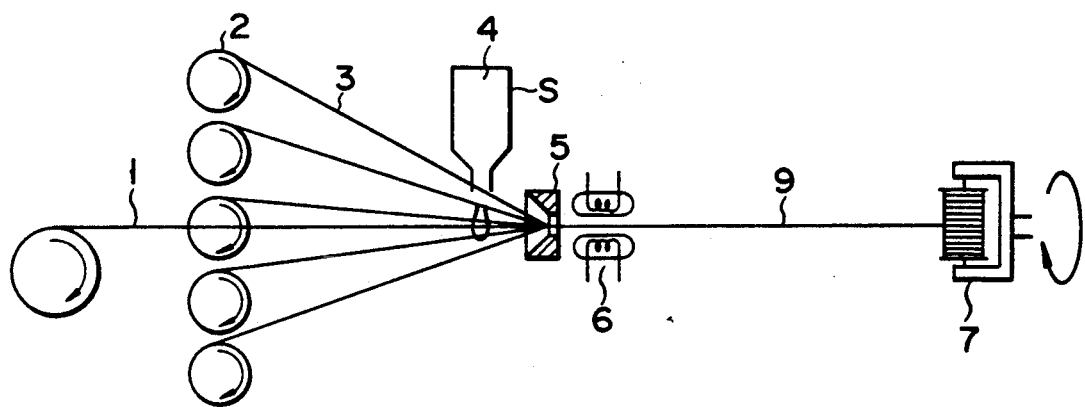
F I G. 5

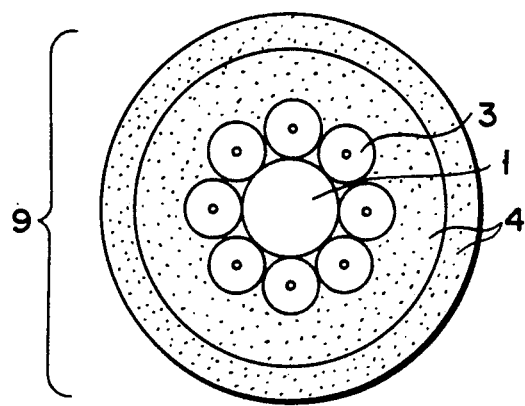
F I G. 6A
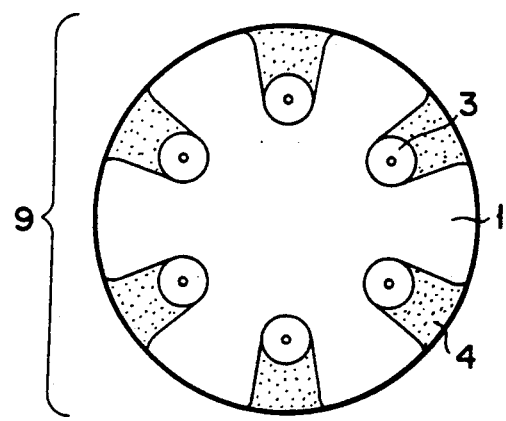
F I G. 6B
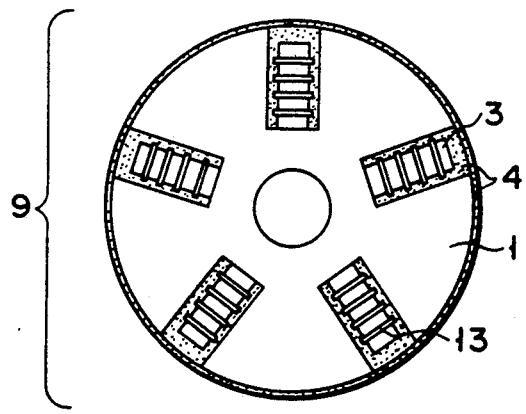
F I G. 6C
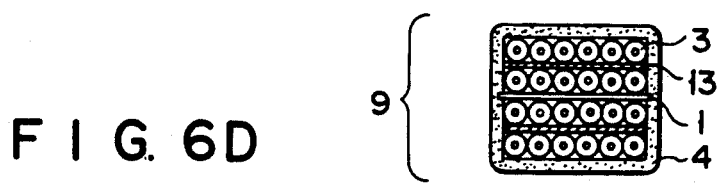
F I G. 6D

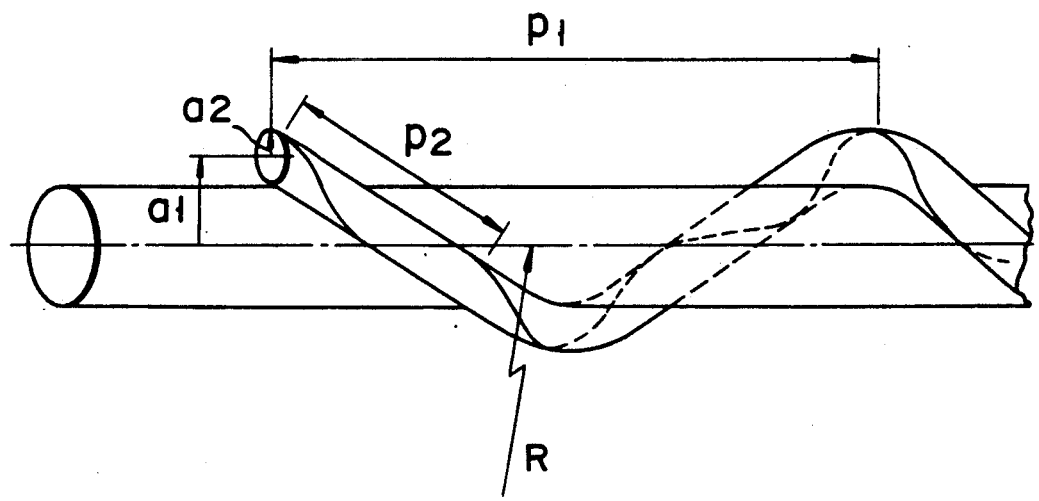
F I G. 10
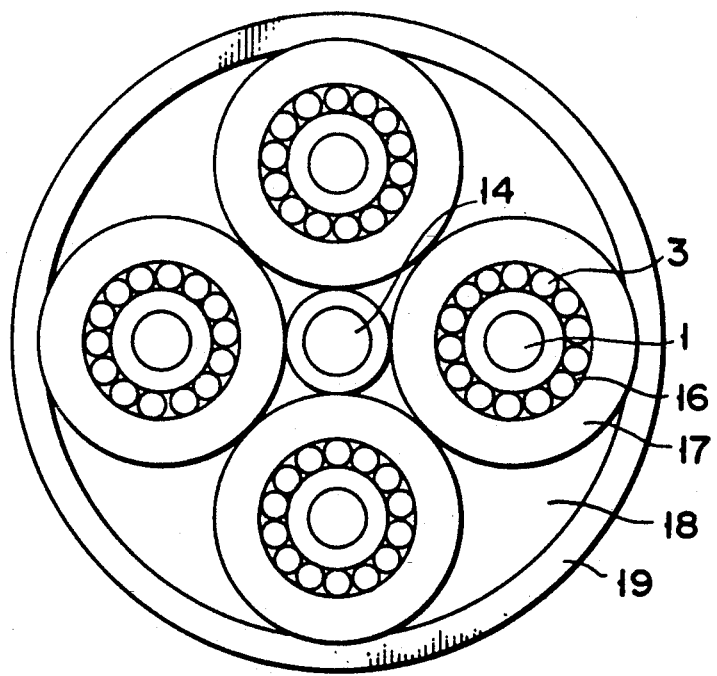
F I G. 11

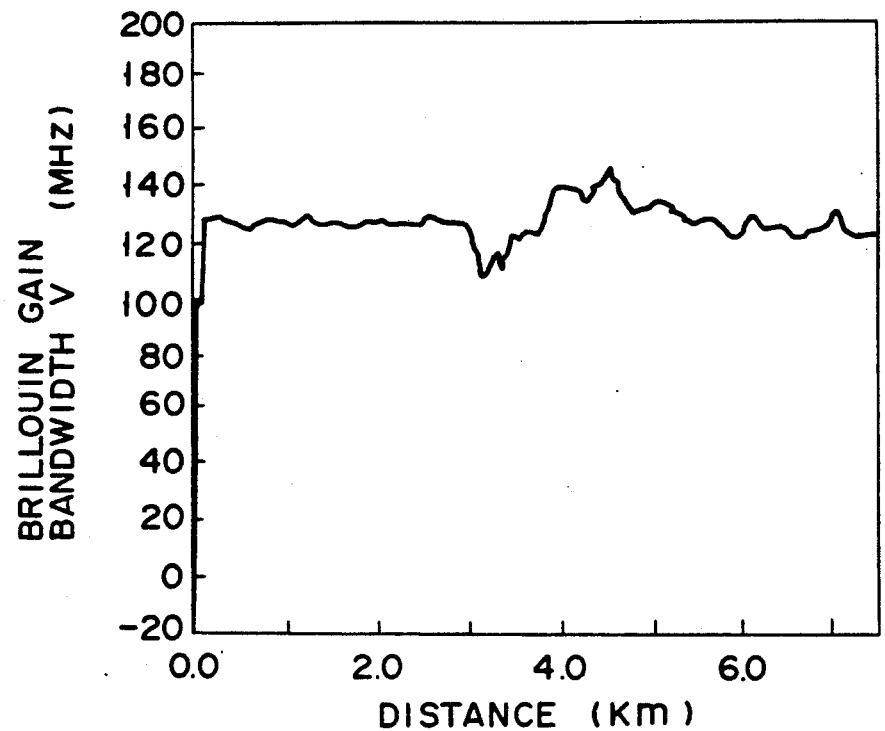
F I G. 12
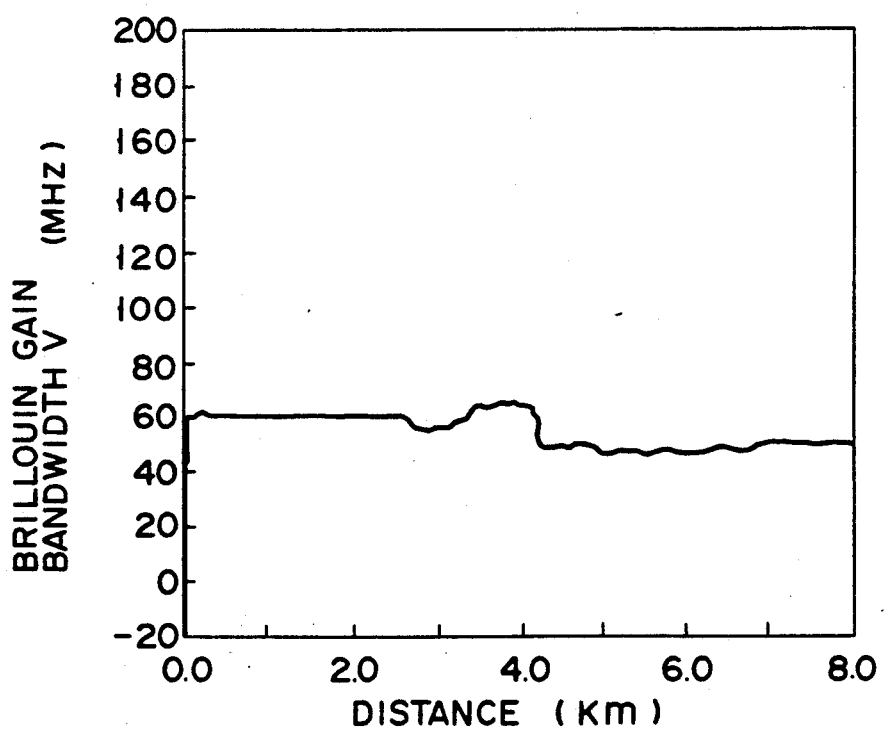
F I G. 13

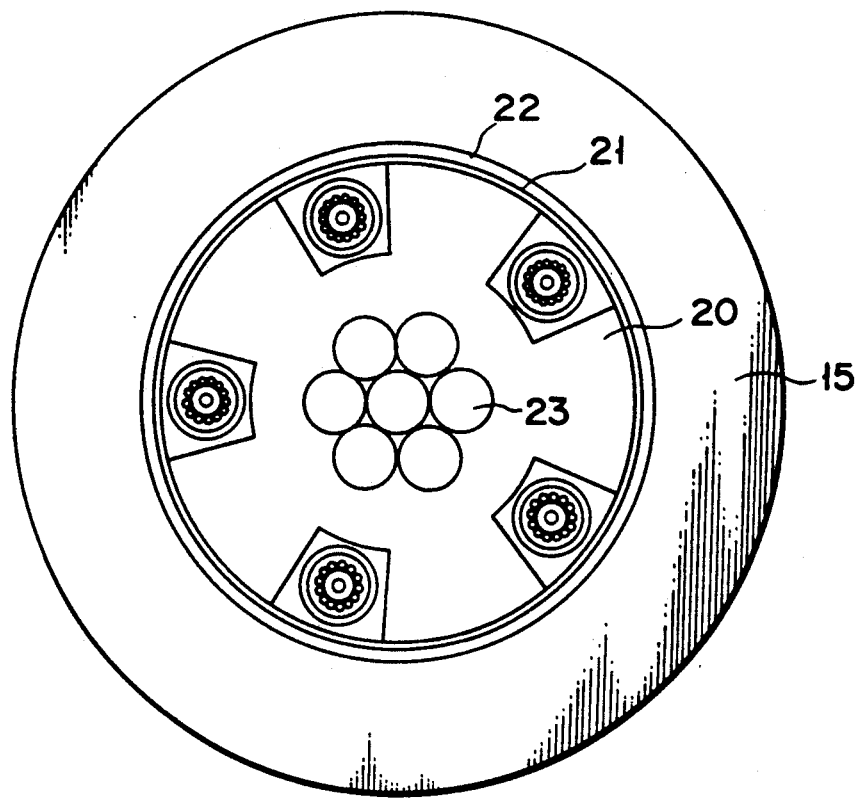
F I G. 15A
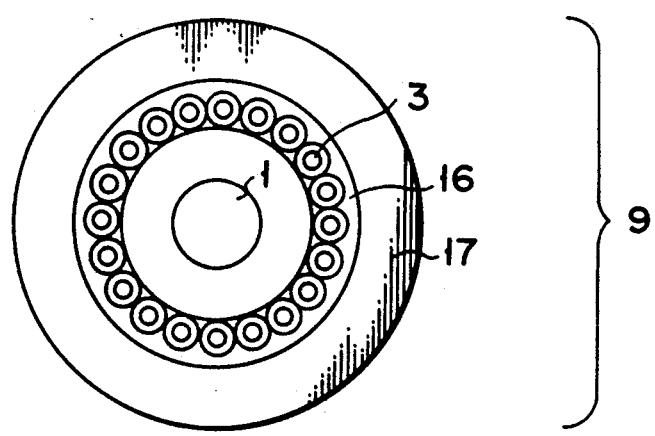
F I G. 15B

OPTICAL CABLE AND ITS MANUFACTURING METHOD

BACKGROUND OF THE INVENTION

1. Field of the Invention

The present invention relates to an optical cable suitable for a long distance communication and a manufacturing method of such an optical cable.

2. Description of the Related Art

In an optical communication system using an optical cable, an optical signal generated from an optical source is transmitted to a distant place through optical fibers within the optical cable and is received by an optical receiver. To transmit the optical signal for a long distance, the optical signal transmitted through the optical fiber must be large in power, the optical fiber, which is a transmitting medium, must be low in optical loss, and the optical receiver must be high in sensitivity. However, in the conventional optical cable, the optical power transmitted from the optical source through the optical fiber is reflected within the fiber due to stimulated Brillouin scattering (SBS), so that, even if the optical power is ever being increased, the optical power which can be transmitted through the optical fiber (hereinafter referred to as transmitted power) will soon reach at its upper limit. FIG. 1 shows an example of the experimental results of the transmitted power within the fiber, in which a laser beam having a spectral width (FWHM) of 73 kHz is introduced into a single mode optical fiber of a quartz group with a 125 micron diameter. Even if the optical power of the optical source is ever being increased, the transmitted power will be saturated at about 1 mW and will not be increased any more. FIG. 1 also shows that the curve of a back-scattering power will sharply increase due to the transmitted power being saturated. The limitation imposed upon the transmitted power due to the stimulated Brillouin scattering will be a great hindrance in increasing a transmission distance.

In the conventional optical cables for a long distance communication, the optical fibers are generally designed such that they will surely be prevented from being stretched or strained, because they are mechanically fragile. What follows is a literature which is written from a viewpoint of reducing strain: S. Hatano etc., "Multi-hundred-fiber cable composed of optical fiber ribbons inserted tightly into slots," Proceeding of IWCS, 1986. This literature happens to show an optical cable with a double helix structure. The detail of the double helix structure is stated in the literature, W. Katsurashima "Characteristics of 1000-Fiber Optical Cable Composed of Tape-Slot Type Optical Fiber Units," Technical digest of IOOC'89, Paper No. 1983-10. According to this literature, the double helix structure in the conventional optical cable is designed such that the fibers move freely within the cable so as to relieve a bending strain which may occur within each of the fibers when laying the cable.

In short, the prevention of strain is a generally accepted idea in the conventional optical cables, but it is not ever proposed to positively provide an optical cable with strain, which is uneven in the longitudinal direction of the optical cable, for increasing the Brillouin gain bandwidth, a critical input power and the transmission distance.

In addition, it is also generally known to bind coated fibers together with adhesive resin so as to form an optical fiber unit. Such a technique is described, for instance, in the following literature: N. Yoshizawa et al., "Design and Characteristics of Optical Fiber Unit for Submarine Cable," IEEE, JLT, Vol. LT-3, No. 1, 1985. In this literature, the optical fibers and the cable core are closely adhered to one another with adhesive resin, so that the fibers and the core elongate or contract as an integral optical unit and water is prevented from entering into the optical fiber unit. The water propagation blocking property of this unit is described in the following literature: N. Yoshizawa et al., "Water Propagation Blocking Properties of Submarine Optical Fiber Cables," Electronics and Communications in Japan, Part 2, Vol. 70, No. 7, 1987.

In contrast, in the present invention, adhesive resin is used to bind the coated optical fibers, each positively given strain, to a center member to prevent the strain having been given to each fiber from being averaged in the longitudinal direction of each fiber, which technique is not disclosed in any of the above references.

SUMMARY OF THE INVENTION

The object of the present invention is to provide an optical cable which can greatly increase in transmitted power, the power being restricted in strength in the conventional optical cables, without changing a transmission system and/or optical fibers which belong to a transmitting medium, and to provide a manufacturing method of such an optical cable.

To achieve the above object, an optical cable in the present invention comprises, a center member, coated optical fibers, each being given uneven strains in its longitudinal direction, stranded tightly round the center member, and adhesive resin surrounding each of the coated optical fibers and combining the coated optical fibers with the center member to make an integral optical unit when cured.

The manufacturing method of an optical cable in the present invention comprises the steps of, drawing a center member out of a bobbin, drawing coated optical fibers out of their bobbins, which are located around a drawn out portion of the center member, with giving altering tension to each of the drawn out fibers to allow it to have uneven strain in its longitudinal direction, stranding the drawn out fibers round the drawn out center member, supplying and curing adhesive resin around each of the drawn out fibers to combine them with the drawn out center member to make an integral optical unit.

Due to the above structure, it becomes possible in the optical cable and its manufacturing method in the present invention to increase an optical power which optical fibers can transmit and to increase a transmission distance.

BRIEF DESCRIPTION OF THE DRAWINGS

FIG. 2 is an explanatory view for showing one example of an optical unit manufacturing method in the present invention;

FIG. 5 is an explanatory view for showing another example of the optical unit manufacturing method in the present invention;

FIG. 6A shows a first structural example of the optical unit in the present invention;

FIG. 6B shows a second structural example of the optical unit in the present invention;

FIG. 6C shows a third structural example of the optical unit in the present invention;

FIG. 6D shows a fourth structural example of the optical unit in the present invention;

FIG. 10 is an explanatory view showing dimensions for calculating the amplitude of strain in the optical cable structure shown in FIG. 9;

FIG. 11 shows a structure of another embodiment of the optical cable in the present invention;

FIG. 12 shows measurement results of the Brillouin gain bandwidth of the optical cable shown in FIG. 11;

FIG. 13 shows measurement results of the Brillouin gain bandwidth of one optical fiber used in the cable shown in FIG. 11.

FIG. 15A shows another embodiment of the optical cable in the present invention; and FIG. 15B is an enlarged view of one optical unit shown in FIG. 15A.

DETAILED DESCRIPTION OF THE PREFERRED EMBODIMENTS

Now, preferred embodiments of the present invention will be explained below with reference to the attached drawings.

An optical fiber has a critical input power I which occurs due to stimulated Brillouin scattering. The critical input power I may be expressed as follows:

$$I = A\alpha V \quad (1)$$

in which A stands for the constant of proportion, $\alpha$ for the optical loss of the fiber, and V for the Brillouin gain bandwidth. This expression tells us that the input power increases with the increase in V.

Figure 1:
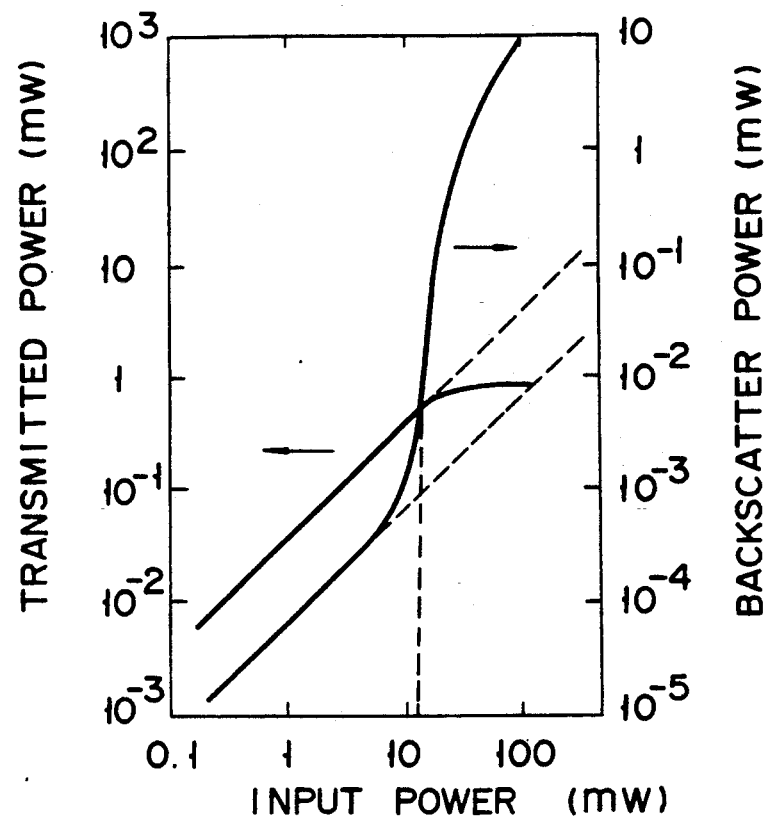
FIG. 1 is an explanatory view for showing that an optical input power in the conventional optical cable has a restriction due to stimulated Brillouin scattering.
Figure 3:
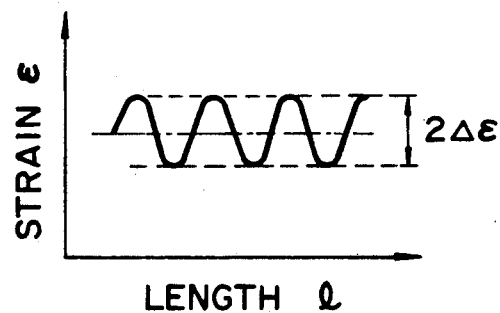
FIG. 3 is an explanatory view for showing a fluctuation of strain, which is present within an optical fiber in an optical cable and is effective to suppress stimulated Brillouin scattering.

Now, let us suppose that the optical fiber has a fluctuation of strain in its longitudinal direction, which may be denoted by $\pm \Delta\epsilon$ as shown in FIG. 3. Then, the strain has the following relation with V when V has the unit of MHz:

$$\Delta\epsilon = B(v - V_0) \quad (2)$$

in which B stands for the constant of proportion, which is about $1 \times 10^{-5}$ in the Ge-doped fiber, and $V_0$ stands for the Brillouin gain bandwidth when no strain exists.

It is apparent from the above two expressions that the Brillouin gain bandwidth may increase by giving to each optical fiber within the cable the strain fluctuation $\pm \Delta\epsilon$ which fluctuates in the longitudinal direction of respective fibers, and that as a result of the increase in Brillouin gain bandwidth the critical input power may finally increase.

In the present invention, therefore, each optical fiber within an optical cable is positively given strain which alters in the longitudinal direction of the optical fiber to solve the above-mentioned task.

It is a conventional practice when an optical cable is used on land that optical fibers are loosely received within the optical cable for the purpose of relieving any strains which may occur in the fibers when the cable is bent. A strain-holding structure such as shown in the present invention opposes to the above purpose, as everyone can soon understand. Therefore, the conventional optical cables do not have a strain-holding structure and optical fibers received within each conventional optical cable are not given any strains. In the cables which are used on sea-bed, the center member and optical fibers are tightly glued together to prevent water from entering into the cable. The structure itself allows the possibility of giving strain to each fiber, but there is no example that strain is intentionally given to each fiber as the present invention, or that strain which varies in the longitudinal direction of each fiber is given.

In the first embodiment of the present invention, an optical cable is formed as follows: Coated optical fibers or assemblies of coated optical fibers are drawn out of their bobbins with strain, which alters in time, being given and are stranded round a center member which is much larger in bending and tensile rigidity than the optical fibers. Alternatively, the coated optical fibers or the assemblies of coated optical fibers thus drawn out of their bobbins are placed on both the upper and lower surfaces of the center member. A steel wire or a so called slotted rod (a polyethylene rod having on its surface spiral grooves) may be used a the center member. Then adhesive resin is applied to the resultant structure and is cured to form an optical unit. Since the center member is much larger in bending rigidity than the optical fibers, as stated above, and is integrally combined with the optical fibers by the adhesive resin, the strain which is given to the optical fibers when producing the optical cable remains in the optical fibers as longitudinally varying strain.

It is needless to say that an advantage of giving longitudinally uneven strains may be lost if the binding force of the adhesive resin is very weak. Because, in such a case, the optical fibers may longitudinally move within the cable and the strains may be leveled.

In the second embodiment of the present invention, an optical cable has a structure that optical units are twisted round a cable core. Each optical unit is formed, as in the first embodiment, by twisting coated optical fibers or assemblies of coated optical fibers round a center member, or placing them on both the upper and lower surfaces of the center member, and applying adhesive resin to the resultant structure and curing the resin. In this embodiment, however, strain need not be given to the optical fibers at an optical unit forming process. Since the optical units are twisted round the cable core, the optical fibers twisted round the center member to form one optical unit are further twisted round the cable core along with the other optical fibers twisted round the other center members to form other optical units, which structure is hereinafter referred to as a double helix structure. As any optical fiber twisted round the center member in any optical unit is further twisted round the cable core in the double helix structure, a stretching strain and a compressing strain alternately occur within the optical fiber at a certain cycle determined by stranding pitches of fibers and units.

FIG. 2 shows one example of the optical unit manufacturing method in the present invention. A stranding mechanism 8 draws coated optical fibers 3's out of their respective bobbins 2's, and strands the drawn out optical fibers 2's round a center member 1 which is drawn out of a separate bobbin. A resin applicator S applies adhesive resin 4 to the resultant structure. Then, a shaping die 5 shapes the structure and a curing device 6 immediately cures the resin 4 to form an optical unit 9. The optical unit 9 thus formed is coiled round a reel 7.

Figure 4A:
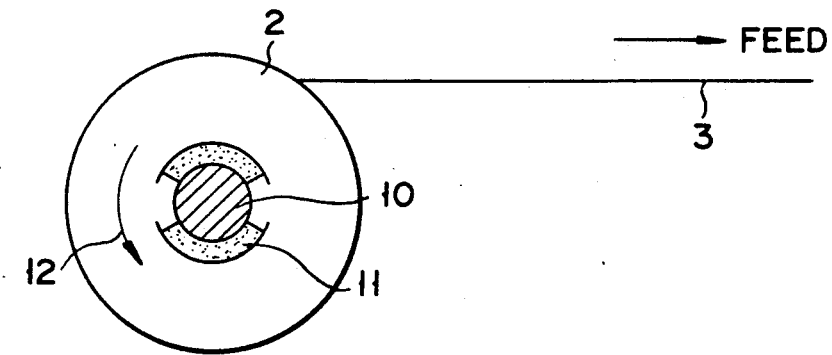
FIG. 4A is an explanatory view for showing a strain controlling method in the present invention.
Figure 4B:
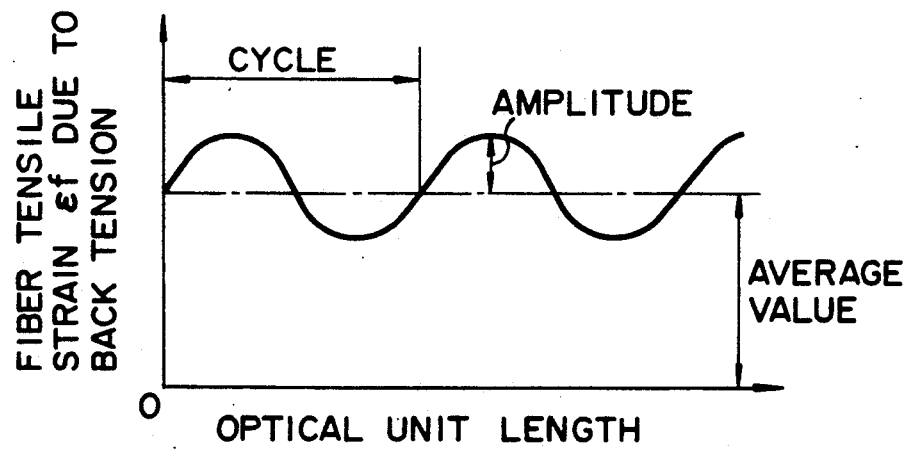
FIG. 4B is an explanatory view for showing a relationship between a changing period of the strain in the optical fiber and a curing time of the adhesive resin.

Each bobbin 2 has as shown in FIG. 4A a shaft 10 and a brake mechanism 11. The brake mechanism 11 controls the rotating movement of the shaft 10 to periodically give a braking force to the bobbin 2. The braking force acts on the coated optical fiber 3 as a back tension 12, because the coated optical fiber 3 is continuously fed from the bobbin 2. As a result, the coated optical fiber 3 fed from the bobbin 2 will be periodically stretched to have a periodic strain, which is kept remaining in the fiber 3 by binding it to the center member 1 with using the adhesive resin 4. It should be noted therefore that the curing time of the adhesive resin 4 must be shorter than the fluctuation cycle of the fiber stretching tensile strain is caused by the back tension (see FIG. 4B). An ultraviolet curing resin of a urethane group, that of an epoxy group, and that of a silicone group will satisfy this requirement so that one of them may be used as the adhesive resin 4 and an ultraviolet lamp is used as the curing device 6 as shown in FIG. 2. A heat curing resin or a thermoplastic resin may be used if they satisfy the above requirement. Note that it is possible to provide a further resin applicator and a further curing device along the center member 1 in addition to the resin applicator S and the curing device 6 shown in FIG. 2. In such a case, six through twelve coated optical fibers 3's twisted round the center member 1 may be embedded within a soft resin whose Young's modulus is lower than 1 Kg/mm$^2$ and the resultant structure may be coated with a hard resin whose Young's modulus is 30-70 Kg/mm$^2$ to form an optical unit having a diameter of about 3 mm. The center member 1 must be much larger in bending rigidity than the optical fibers 3's. A steel wire, which has a diameter of 0.2-1 mm and is coated with resin, or a polyethylene rod, which has a diameter of 5-10 mm and is provided with spiral grooves which longitudinally extend on its surface may be used as the center member. A coated optical fiber, which has a coating diameter of 0.2-1 mm and is surrounded by two layers of ultraviolet curing resin, or a ribbon shaped fibers, in which 2-12 single optical fibers are arranged side by side and are integrally bound to one another with resin, may be used as the coated optical fiber 3.

FIG. 5 shows another example of the optical unit manufacturing method of the present invention. In this example, what is rotated for stranding the fibers round the center member is not the stranding mechanism 8 but the winding mechanism 7. This example is particularly suitable for receiving a multitude of ribbon shaped fibers 3's within the slotted rod. Each bobbin 2 is periodically given a back tension as in the first example.

In the optical cables in the present invention, a large tensile strain of about 1-2 % will act on each optical fiber. Therefore, if the conventional optical fibers are used, they may be broken. The carbon-coated optical fibers recently developed are improved in fatigue resistance in comparison with the conventional optical fibers, and thus may be used in the present invention. The withstand characteristics of the carbon-coated optical fibers are described in the following paper: K. E. Lu et. al., "Recent Developments in Hermetically Coated Optical Fiber," IEEE, JLT Vol. 6, No. 2, 1988.

FIG. 6A through FIG. 6D respectively show structural examples of the optical unit 9 in the present invention. They are commonly characterized by a strain-holding structure that the optical fibers are integrally bound to the center member, which is large in bending rigidity, with the use of adhesive resin.

In FIG. 6A, a resin coated steel wire is used as the center member 1. A plurality of single optical fibers 3's, each having a coating diameter of about 0.2-1 mm, are stranded round the center member 1 and are tightly bound to it by an ultraviolet curing resin, which is used as the adhesive resin 4, to form a cylindrical optical unit having a diameter of 2-3 mm.

In FIG. 6B, a slotted rod is used as the center member 1. A plurality of single optical fibers 3's are inserted into the corresponding grooves of the slotted rod and bound there by the ultraviolet curing resin 4. The slotted rod may be made of polyethylene or copper or aluminum. Each optical fiber 3 is held where it is by both the binding force of the applied adhesive resin and the frictional force between the optical fiber itself and the groove where it is inserted, so that the strain exerted in the fiber will stably remain in it for a long time. The diameter of the slotted rod is 2-3 mm.

In FIG. 6C, a plurality of ribbons, each made of optical fibers 3's, are placed one upon another to form a stratified ribbon structure. A plurality of the stratified ribbon structures are then inserted into the corresponding grooves of the slotted rod and are bound there by the ultraviolet curing resin 4. The ribbon has a width of about 1.1 mm and a thickness of about 0.4 mm, if it is made of four optical fibers. Therefore, if five ribbons are inserted into each of five grooves to form a hundred optical fiber structure, the slotted rod will have a diameter of about 10 mm. Note that ribbons 3's and adhesive bodies 13's are alternately placed one upon another in each stratified ribbon structure in FIG. 6C. The adhesive bodies 13's are a tape having adhesive material on its both sides. They are used for bonding the adjacent ribbons together.

In FIG. 6D, a stainless steel tape or a steel tape is used as the center member 1, and a plurality of ribbons, each made of optical fibers 3's, are placed on the upper and lower surfaces of the center member 1.

Each of the above optical units shown in FIG. 6A through FIG. 6D may be received in a polyethylene sheath or an LAP sheath to form a cable. When each of the above optical units is used on sea-bed, it may be inserted into a pressure resistant pipe integrally consisting of the steel wire and the welded metal pipe.

Now, the relationship between the optical cable manufacturing method in the present invention and largeness in periodically changing strain which remains in one optical fiber in an optical cable will be explained below.

Figure 7A:
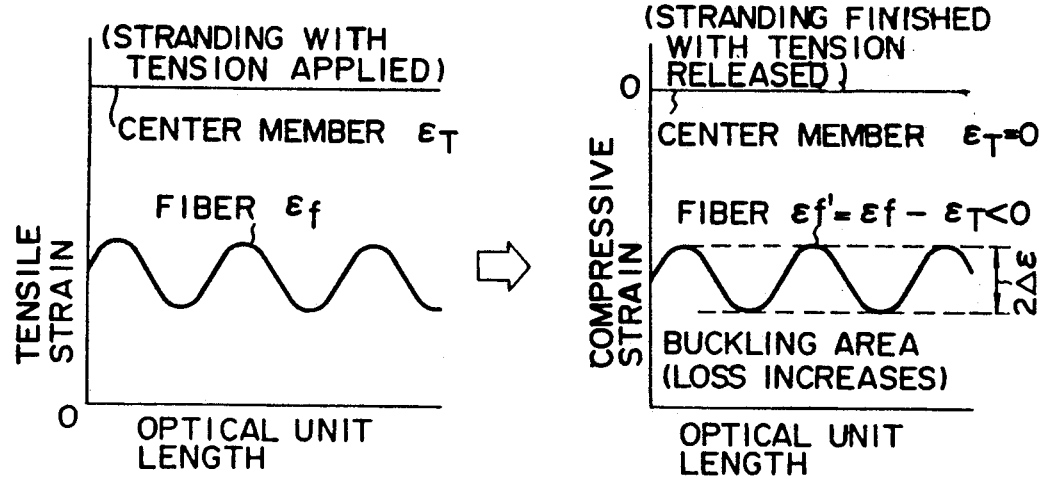
FIG. 7A through FIG. 7C show the distribution of strains obtained by using the manufacturing method of the present invention.
Figure 7B:
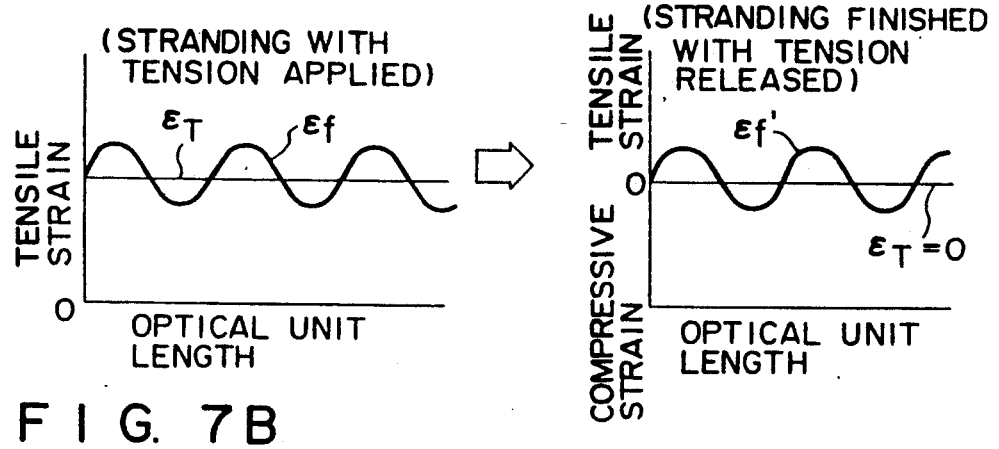
Figure 7C:
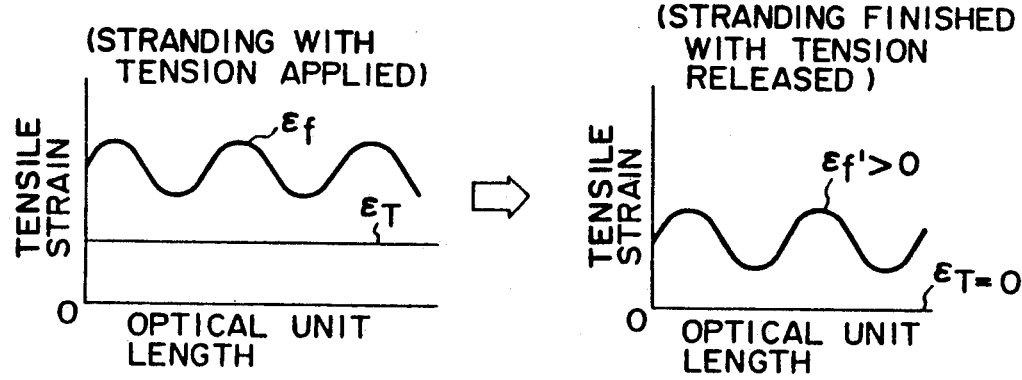

In each of the manufacturing methods shown in FIG. 2 and FIG. 5, the center member 1 drawn out of its bobbin is given back a tension by the braking force of its bobbin, and each coated optical fiber 3 drawn out of its bobbin is given a back tension by the braking force of its bobbin. Let us suppose that $\epsilon_T$ stands for the tensile strain which occurs in the center member 1 due to the back tension acting on it, and that $\epsilon_f$ stands for the tensile strain which occurs in one optical fiber 3 due to the back tension acting on it. The optical unit is manufactured under the condition that the center member 1 and each optical fiber 3 have their own strain in them. However, once the optical unit has been manufactured, the center member 1 is relieved from its back tension and the strain $\epsilon_T$ of the center member 1 becomes almost zero. What remains is the strain $\epsilon_f'$ acting on each optical fiber in the optical unit. Therefore, the strain $\epsilon_f'$ which remains in one optical fiber will be explained below taking into consideration three separate cases as shown in FIG. 7A through FIG. 7C. In the following explanation, $\overline{\epsilon_f}$ is an average of $\epsilon_f$.

Case 1: If $\epsilon_T > \overline{\epsilon_f}$, then $\epsilon_f' = \overline{\epsilon_f} - \epsilon_T < 0$. Therefore, the compressive strain remains in the optical fiber at an average. If the compressive strain becomes 0.2 % or more, the optical fiber buckles, and the bending loss of the optical fiber increases. Namely, the transmission loss increases. It is, therefore, necessary to control the tension when manufacturing so that the compressing strain will be lower than 0.2 %.

Case 2: If $\epsilon_T = \overline{\epsilon_f}$, then $\epsilon_f' = 0$. Therefore, the tensile strain and the compressive strain will remain periodically in the optical fiber.

Case 3: If $\epsilon_T < \overline{\epsilon_f}$, then $\epsilon_f' = \overline{\epsilon_f} - \epsilon_T > 0$. Therefore, the tensile strain will remain in the opt fiber. The presence of the tensile strain in the optical fiber reduces the breakage strength in a long period of time. The tensile strain which can be tolerated by the optical fiber used in the optical cable is determined by a proof strain and a fatigue coefficient value n. In an optical fiber of a $SiO_2$ group in which the n value is about 20, the tensile strain which can be tolerated for about twenty years is about $\frac{1}{4}$ through $\frac{1}{4}$ of the proof strain. If the proof strain, for instance, is 2 %, then the tolerable tensile strain is 0.5 %. If the proof strain is 0.5 %, then the tolerable stretching strain is about 0.2 %. It must be kept in mind that $\epsilon_f'$ must not exceed the value thus determined. If a hermetically coated fiber, such as a carbon coated fiber, is used, the tensile strain which can be tolerated for about twenty years can be enlarged to about 90 % of the proof strain. For instance, if the proof strain is 2 %, the tolerable tensile strain will be about 1.8 %. Since a large tensile strain can be thus tolerated, the stimulated Brillouin scattering will be largely suppressed.

The relationship between the amplitude of the strain remaining in the fiber and the amount of the critical input power will be shown below. In the expression (3), $I_0$ stands for the critical input power obtained by the Brillouin gain bandwidth $V_0$ under the strain-free condition, and I stands for the critical input power where the periodical strain of $\pm \Delta\epsilon$ is given to the optical fiber.

The following expression will be obtained from the relation between the expression (1) and the expression (2)

$$I/I_0 = (\Delta\epsilon/BV_0) + 1 \quad (3)$$

Figure 8:
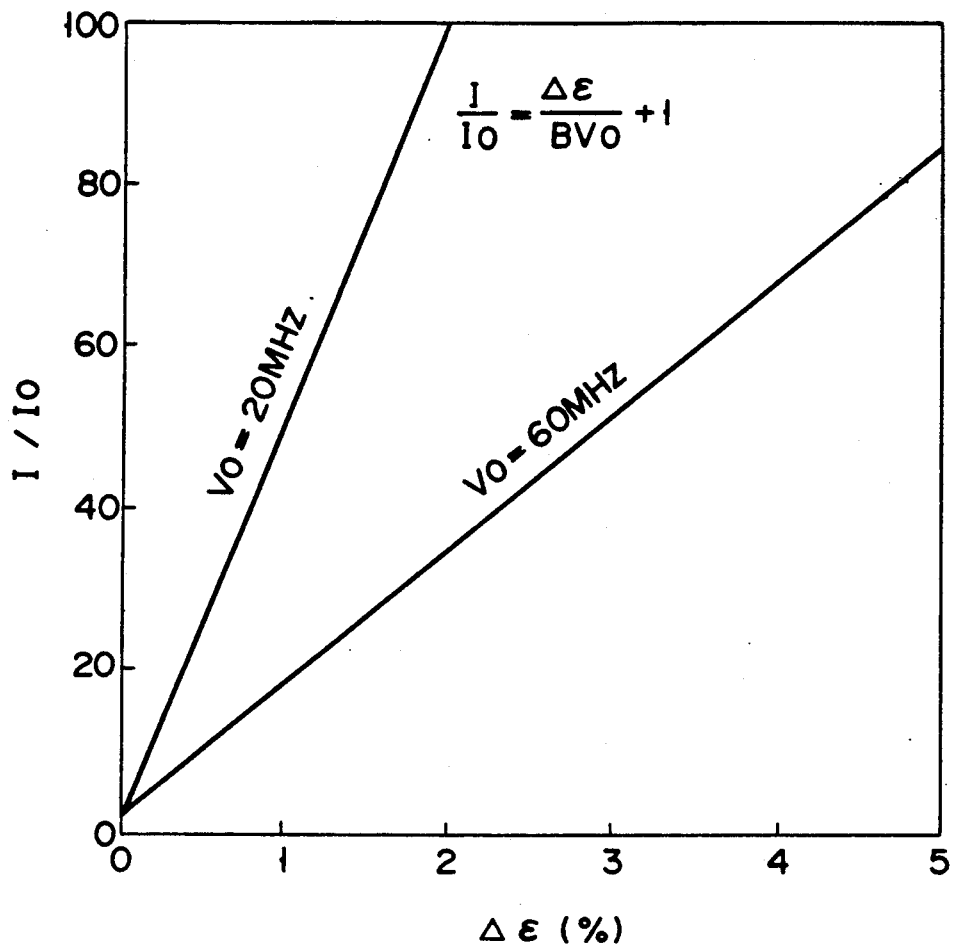
FIG. 8 is an explanatory view for showing a relationship between a critical input and a strain amplitude in the present invention.

FIG. 8 shows the calculation results of the expression (3). Let us suppose, for instance, that $V_0 = 20$ MHz, then the application of an amplitude which the strain of $\pm 1$ % has increases the critical input power by fifty times.

Figure 9:
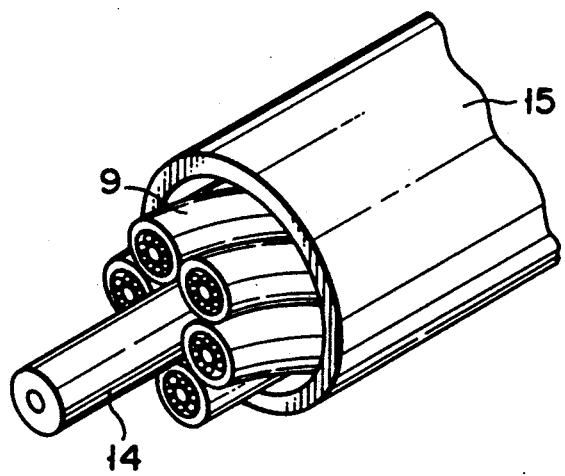
FIG. 9 is a perspective view showing a structure of one embodiment of the optical cable in the present invention.

FIG. 9 shows one structural embodiment of the optical cable in the present invention. In this embodiment, the optical units each having a strain-holding structure as shown in FIG. 6A are stranded round the cable core 14. The sheath 15 may be provided as the needs of the case demands. A polyethylene rod having a steel wire in its center is generally used as the cable core. The main purpose of the sheath is the protection and fixation of the optical units 9's. There is no need to closely combine the cable core 14 with the optical units 9's. It is not necessarily needed to have periodically changing strain remained within each of the optical units. In this structure, the bending strain which occurs in each optical fiber due to the double stranding operation will be expressed by the following expression, wherein the symbols used are shown in FIG. 10:

$$\epsilon = \frac{2\pi a_1}{P_1} \cdot \frac{2\pi a_2}{P_2} \cos[(\nu - 1)\theta - \phi] + \frac{a_1}{R}\cos(\theta + \phi) + \frac{a_2}{R}\cos(\nu\theta) \quad (4)$$

wherein $P_1 \gg 2\pi a_1$, $P_2 \gg 2\pi a_2$, and $\nu = \frac{2\pi}{P_2} \sqrt{a_1^2 + (p_1/2\pi)^2}$.

The symbol $\theta$ stands for a parameter indicating a longitudinal position z of the cable, and is given by $\theta = 2\pi Z/p_1$. The symbol $\theta$ stands for a phase difference between a stranding pitch $p_2$ and a stranding pitch $p_1$. The symbol R stands for a bend radius, or a distance between the center of the cable core 14 and the center of the drum around which the cable is wound. In the expression (4), the first term stands for the strain which occurs when the optical units are stranded round the cable core, and the second and third terms stand for the strain which occurs when the cables are bent or coiled.

An optical cable which has a structure shown in FIG. 11 and has a length of 4 km was made. Fiber loops were made by splicing the fibers at the cable end. Brillouin gain bandwidth distribution in the cable was measured from the other end of the cable. The results are shown in FIG. 12. FIG. 13 shows the measuring results of the original optical fibers, wound loosely around a fiber bobbin before cabling. It is apparent from these figures that the Brillouin gain bandwidth of the optical fiber is about 130 MHz when it is double stranded to form the cable, whereas the Brillouin gain bandwidth the optical fiber is 60 MHz when it is not double stranded to form the cable. Therefore, strain having an amplitude of 0.07 %, which can be calculated from the expression (2), remains in the optical fiber due to the formation of the optical cable. The dimensions and the materials of the optical cable is shown in Table 1.

TABLE 1

| Materials and Dimensions for Optical Cable | |
|---|---|
| | Dimensions and Materials |
| Coated Optical Fiber | UV Curable Urethane Coating with Outer Diameter of 0.25 mm |
| Center Member | Steel Having Outer Diameter of 0.45 mm and Covered with UV Curable Urethane, Resultant Structure Having |

TABLE 1-continued
Materials and Dimensions for Optical Cable

| | Dimensions and Materials |
|---|---|
| First Adhesive Resin | Outer Diameter of 0.8 mm UV curable Urethane Having Outer Diameter of 1.75 (Young's Modulus: 3-5 kg/mm$^2$) |
| Second Adhesive Resin | UV Urethane Having Outer Diameter of 2.15 mm (Young's Modulus: 40 kg/mm$^2$) |
| Stranding Pitch of Fibers | 230 mm |
| Cable Core | Steel Having Outer Diameter of 0.6 mm and Covered with UV curable urethane, Resultant Structure Having Outer Diameter of 0.9 mm |
| Buffer Layer | UV Curable Urethane Having Outer Diameter of 5.2 mm |
| Jacket Layer | UV Curable Urethane Having Outer Diameter of 5.5 mm |
| Stranding Pitch of Optical Fiber Unit | 180 mm |

NOTE: UV stands for ultraviolet

Figure 14:
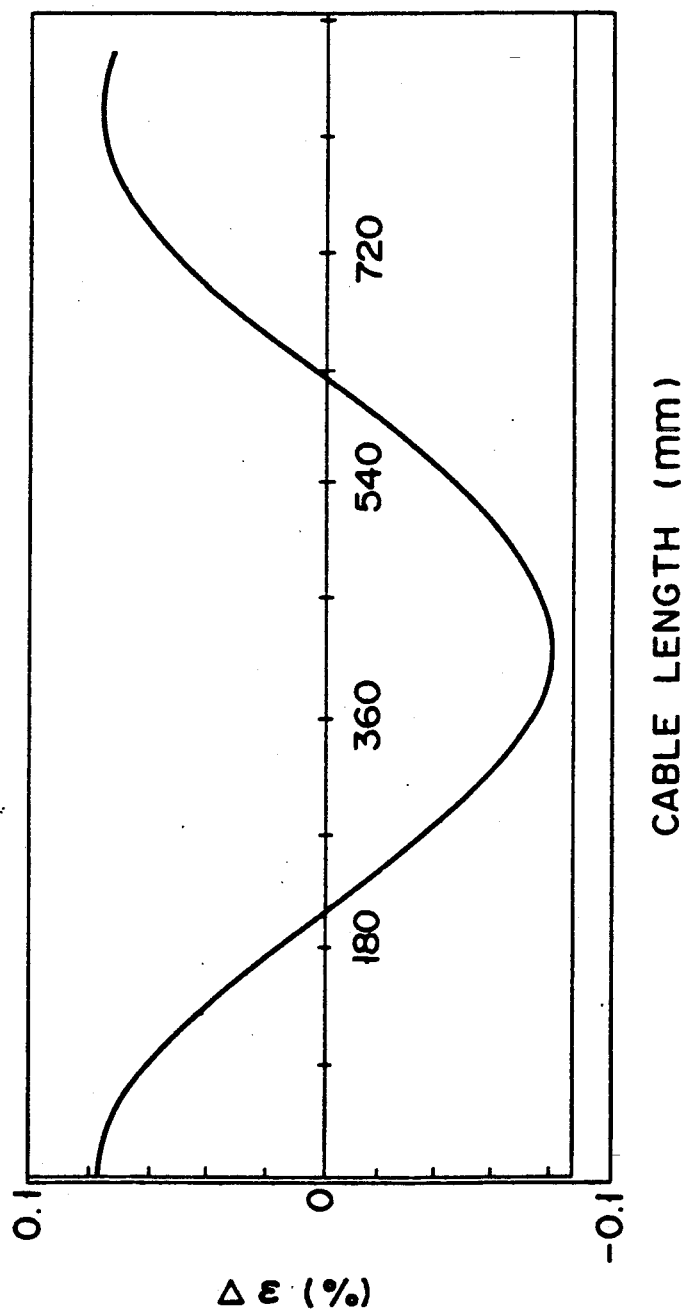
FIG. 14 shows the calculation results of the strain amplitude of the optical cable shown in FIG. 11.

FIG. 14 shows strain calculated from the expression (4). It is apparent that the strain which has an amplitude of about 0.08% and is nearly identical with the measuring results will periodically occur.

What follows is the result of the study on the periodic strain given to optical fibers. As shown in the first term of the expression (4), the shorter pitches $P_1$ and $P_2$ will be, the larger strain will be. Therefore, the critical input power will be larger. However, strain consists of compressive strain and tensile strain both having the same amplitude within one pitch. Therefore, it is possible to cancel each other to be zero. What prevents these strains from cancelling each other is the binding function of the coating material of the optical fiber. The binding function depends on the binding force of the coating material itself and the stranding pitch. If the binding force of the material itself is extremely large, however, the extraction of the fibers out of the unit and the fusion splicing will be difficult. Therefore, what is suitable to the coating material may be the resin of a urethane group or a silicone group. The longer the stranding pitch is, the smaller the number of the cancelling of strains within one pitch is. Now, this relation will be quantitatively demonstrated based on the experimental results. Three units, each having an outer diameter of 2.15 mm and a length of 1 km, were made out of the same materials as shown in Table 1 to have the same structure as shown in Table 1. The pitch $P_2$ of the first unit was 30 mm, that of the second unit was 50 mm, and that of the third unit was 100 mm. These units were wound around a bobbin having an outer diameter of 400 mm in such a manner that they were arranged side by side with one another. The Brillouin gain bandwidth was measured, and the fiber strain was calculated from the expression (2). The calculation results showed that the first unit had strain having an amplitude of 0.02 %, the second unit had strain having an amplitude of 0.06 %, and the third unit had strain having an amplitude of 0.12 %. Let us suppose that there was no cancellation in strain. Then, the strain of 0.26 % should have occurred in consideration of the expression (4). Therefore, the shorter the stranding pitch of optical fibers becomes, the easier the cancellation of strains occurs. It can be understood from this experimental result that the pitch or the period of strain should be about 100 mm or more. This fact tells us that it is impossible to give large strain by making equal to or less than 100 mm the fiber stranding pitch $P_2$ in the first term of the expression (4).

FIG. 15 shows another embodiment of the optical cable in the present invention. This embodiment is different from the embodiment shown in FIG. 11 in that optical units shown in FIG. 6A are respectively inserted into the spiral grooves of the rod. The dimensions, materials and other data used in this embodiment are shown in Table 2.

TABLE 2
Materials, Dimensions, and Data for Deep-sea Optical Cable with 100 Optical Fibers

| | Materials, Dimensions, and Data |
|---|---|
| Coated Optical Fiber | Outer Diameter: 0.25 mm Including UV Curable Urethane Coating |
| Center Member | Steel Wire Having Outer Diameter of 0.5 mm and Covered with UV Curabie Urethane Coating, Resultant Structure Having Outer Diameter of 1.35 mm |
| First Adhesive Resin | UV-curable Urethane Having Outer Diameter of 2.35 mm (Young's Modulus: 3-5 kg/mm$^2$) |
| Second Adhesive Resin | UV Curable Urethane Having Outer Diameter of 2.85 mm (Young's Modulus: 40 kg/mm$^2$) |
| Stranding Pitch of Fibers | 180 mm |
| Slotted Rod | Outer Diameter: 18 mm, Groove Depth: 3.5 mm, Five Grooves, Groove Pitch: 130 mm |
| Filling Resin | Synthetic Jelly |
| Tension Resisting Member | Stranding 7 Steel Wires Each Having Diameter of 2.5 mm |
| Winding for Holding | Mylar tape Having Thickness of 0.2 mm |
| Pressure Resistant Pipe | Welded Copper Pipe Having Wall Thickness of 0.6 mm |
| Outer Sheath | Polyethylene, Outer Diameter: 29 mm |
| Cable Weight | In Air: 1.2 kg/m, In Water: 0.58 kg/m |
| Cable Breakage Tension: | 7 t |
| $\Delta\epsilon$ | 0.9% |

Five optical units, each having an outer diameter of 2.85 mm, were made by stranding twenty optical fibers round a steel wire having a diameter of 0.5 mm with a stranding pitch of 180 mm and then binding the stranded fibers to the steel wire with adhesive resin. The optical units were respectively inserted into five spiral grooves, each having a spiral pitch of 130 mm and formed on a polyethylene rod having a diameter of 18 mm. A pressure resisting pipe 22 made of a welded copper pipe of 0.6 mm in thickness was provided through the holding windings, and an outer sheath 15 of polyethylene was injection-molded to form a deep-see cable having an outer diameter of 29 mm. Carbon-coated optical fibers which were excellent in fatigue resistance property were used as the optical fibers.

Lubricant jelly was filled into the grooves to prevent water from entering into the cable and to reduce frictional coefficient so as to allow the optical units to freely move within the grooves. The loose contact between the optical units and the grooves is also one of the characteristic features of the present invention. Its advantage will be quantitatively explained below.

In this structure, $a_1 = 6.6$ mm, $a_2 = 0.8$ mm, $p_1 = 130$ mm, and $p_2 = 180$ mm in the expression (4). Therefore, the strain expressed by the first term in the expression (4), i.e., the strain contributing to the enlargement in the critical input power of light, will be 0.9 %. Let us suppose that $V_0=20$ MHz from FIG. 8, then $I/I_0$ becomes as large as about 40 times. Namely, it is possible to increase the critical input power by about 16 dB. Let us suppose that the loss in optical fiber is 0.2 dB/km, then the non-repeated transmission distance will increase by 80 km.

The strains expressed by the second and third terms in the expression (4) occur when the cable is bent. Therefore, they do not act on the optical fibers when the cable is actually in use, because the cable is straightly laid for use. That is to say, they do not contribute to the enlargement in the critical input power. It must be noted, however, that the cable must pass through the sheave of the cable ship when the cable is drawn out of the cable ship to the sea-bed. If the radius of the sheave is 500 mm, the value of the second term and that of the third term will respectively be 1.32 % and 0.16 %. These strains act on the fibers along with the strain of the first term, so that the optical fibers must be strong enough to withstand a large strain of about 2.4 %. However, in this embodiment, the optical units are loosely inserted in the respective grooves, as stated before, and the grooves are filled with jelly which acts as a lubricant. Therefore, the optical units move to and fro within the grooves when the cable is bent and the strain indicated by the second term will not occur. As a result, the bending strain actually acts on the optical units is restricted to the small strain indicated by the third term.

If the compressive strain becomes 0.2 % or more, the optical fiber will buckle and transmission loss will increase. To prevent such an occasion, each optical fiber is given a back tension when an optical unit is manufactured, so that the strain expressed by the first term, the tensile strain of 0.9 % in this example, is remained in the fiber after the optical unit is made. When the unit is inserted into the groove, the optical fiber is given the tensile strain of $0.9\pm0.9$ %, so that the compressive strain which is the cause of buckling may be removed.

FIG. 15 shows an example in which the unit shown in FIG. 6A is used. However, it is possible to use the units shown in FIGS. 6B to 6D.

If the number of optical fibers stranded together is small, the grooves may be much slender, so that the strains expressed by the second and third terms may also be small. In such a case, adhesive resin which effectively prevents water from entering may be filled into the grooves. In this embodiment, a welded copper pipe is used for a deep-see cable so that the cable can be used on a sea-bed which is 2000 m or more in depth. However, if the cable is used much shallower areas of water, an aluminum laminated tape or stainless laminated tape, which is much easier in manufacture, may be used instead of the welded copper pipe. A water absorption tape may be used instead of the jelly.

In the above explanation, the optical fiber is given strain which changes periodically. However, it is only necessary that the strain changes in the longitudinal direction of the optical fiber, but it is not necessarily needed that the strain changes periodically. The length of the optical fiber in which stimulated Brillouin scattering effectively occurs is given by the following expression:

$$L_e = 1/\alpha \quad (5)$$

wherein $\alpha$ stands for a loss coefficient of the optical fiber (neper/m). Let us suppose, for instance, that $\alpha=4.6\times10^{-5}$ (0.2 dB/km), then $L_e=22$ km. Therefore, the strain given to the optical fiber must be changing at a spatial frequency of 1/(22 km) or more.

What is claimed is:

1. An optical cable comprising:
   a center member;
   coated optical fibers, each being given uneven strain in its longitudinal direction, stranded around the center member; and
   adhesive resin surrounding each of the coated optical fibers and binding each of the coated optical fibers in their uneven longitudinally strained state, to the center member to make an integral optical unit when cured.

2. The optical cable according to claim 1, wherein the uneven strain given to each of the coated optical fibers in its longitudinal direction periodically changes.

3. The optical cable according to claim 2, wherein the uneven strain has a changing period of 100 mm or more.

4. The optical cable according to claim 1, wherein the uneven strain given to each of the optical fibers in its longitudinal direction is tensile strain.

5. An optical cable with a strain holding double helix unit structure, comprising:
   a cable core member; and
   optical fiber units, each optical fiber unit comprising:
      a center member;
      coated optical fibers stranded around the center member; and
      adhesive resin surrounding each of the coated optical fibers and binding each of the coated optical fibers to the center member to make an integral optical fiber unit when cured; and
   wherein the optical fiber units are stranded around the cable core member to give each optical fiber of the optical fiber unit uneven strain in its longitudinal direction, and said optical fibers are maintained in their uneven longitudinally strained state by said adhesive resin.

6. The optical cable according to claim 5, wherein the uneven strain given to each of the optical fibers in its longitudinal direction includes both longitudinally tensile strain and longitudinally compressive strain, the tensile strain being sufficiently large to cancel the compressive strain.

7. The optical cable according to claim 5, wherein the cable core member has longitudinally extending spiral grooves on its outer circumference surface, and the optical fiber units are loosely received within the spiral grooves, respectively.

* * * * *